United States Patent [19]

Kennedy et al.

[11] Patent Number: 4,475,618

[45] Date of Patent: Oct. 9, 1984

[54] TOY CAR

[75] Inventors: Melvin Kennedy, New York, N.Y.; Dietmar Nagel, Chester, N.J.; Avi Arad, Westport, Conn.

[73] Assignee: Nagel/Kennedy & Associates, New York, N.Y.

[21] Appl. No.: 438,397

[22] Filed: Nov. 1, 1982

[51] Int. Cl.³ .............................................. B62D 61/08
[52] U.S. Cl. ..................................... 180/237; 74/342; 74/405; 180/65.6; 446/463
[58] Field of Search ............. 180/237, 214, 253, 65 R, 180/65 E, 216; 280/249, 1.11 R; 46/251, 201, 202, 206, 209; 74/342, 405, 850

[56] References Cited

U.S. PATENT DOCUMENTS

| | | | |
|---|---|---|---|
| 3,684,046 | 7/1972 | Begleiter | 180/253 X |
| 3,842,928 | 10/1974 | Kishi | 180/214 |
| 4,116,084 | 9/1978 | Masuda | 46/209 X |

FOREIGN PATENT DOCUMENTS 2023014 12/1979 United Kingdom ................. 46/206

Primary Examiner—Joseph F. Peters, Jr.
Assistant Examiner—Mitchell J. Hill

[57] ABSTRACT

A power driven toy car includes a system for coupling power from a power source to the driving wheels of the toy car, which system automatically decouples the power source from the driving wheels when the power source is deactivated to permit free rotation of the driving wheels.

5 Claims, 6 Drawing Figures

TOY CAR

DESCRIPTION OF THE INVENTION

The invention relates generally to toy cars, and, in particular, to power driven toy cars.

There have been many examples of power-driven toy cars. In general, these toy cars have a power source, such as a motor, coupled to a transmission mechanism which is permanently coupled to the driving wheels of the toy car to transmit driving power from the power source to be transmitted to the driving wheels upon activation of the motor. Since the motor and driving wheels of the car are always coupled through the transmission mechanism when the motor is not activated, any attempt to rotate the driving wheels when the motor is not activated can cause serious damage to the transmission mechanism and motor.

One attempt to overcome this problem is described in U.S. Pat. No. 4,152,866, which discloses a motor-driven toy car in which a motor is coupled to rear driving wheels of the car by a transmission mechanism including gears which transmit driving power from the motor to the rear wheels. Intermediate gears in the transmission mechanism are axially movable with respct to other gears in the transmission mechanism. A hand-activated lever is pivotably mounted on the car and coupled to the axially movable intermediate gears. To operate the car, the child must activate the motor and pivot the lever to cause the intermediate gears to engage the other gears in the gear train and cause power to be applied to the rear wheels. When the child wants to stop the car, the child must deactivate the motor and remember to pivot the lever to disengage the intermediate gears in the transmission mechanism in order to free the rear wheels and prevent damage to the motor and transmission mechanism which could be caused by a child attempting to move the car without activating the motor.

The car described in U.S. Pat. No. 4,152,866 does not provide a complete solution to the problem of damage to the transmission mechanism and gear train, since it requires that the child manually operate a lever after the vehicle has stopped in order to disengage the intermediate gears in the transmission mechanism. The possibility, therefore, exists that the child will either forget to operate this lever or not understand how the lever is to be operated or that, in fact, the lever should be operated and the possibility of damaging the transmission mechanism and motor remains.

It is to overcome these problems in the prior art that this invention was made. In particular, it is an object of the invention to provide a power driven toy car in which intermediate gears in a transmission mechanism automatically engage and disengage the other gears in the transmission mechanism upon, respectively, the activation and deactivation of the power source.

It is a more general object of the invention to provide a transmission mechanism for a toy car coupled between a power source and the drive wheels of the toy car to power the driving wheels when the power source is activated and which is automatically decoupled when the power source is deactivated to free the driving wheels for rotation, thereby preventing damage to the mechanism and power source.

It is a further and more specific object of the invention to provide a front wheel drive toy car.

In accordance with the invention, the toy car comprises a body, driving wheels coupled to the body to permit the car to be propelled along a surface, a power source mounted to the body and a transmission mechanism for operatively and selectively coupling the power source to the driving wheels. Activating means selectively activates the power source which automatically causes the power source to be coupled to the driving wheels causing the toy car to move under power supplied by the power source and deactivates the power source which is automatically decoupled from the driving wheels, thereby freeing the driving wheels for rotation independently of the power source.

In a particular embodiment of the invention, the power source is a motor and the transmission mechanism includes driving, intermediate and driven gears coupling the motor to the driving wheels of the toy car. The intermediate gears are held on a rod having one end which rides in a slot formed in a wall of the housing. A spring is connected between the rod holding the intermediate gears and the housing wall. When the motor is deactivated, the spring biases the end of the rod to a first end of the slot which moves the intermediate gears out of engagement with the driving and driven gears, decoupling the motor from the driving wheels and permitting free rotation of the driving wheels. When the motor is activated, the driving gears automatically force the intermediate gears to move into engagement with the driven gears, such movement being permitted by properly sizing and placing the slot in which the end of the intermediate gear rod rides, thereby supplying power to the driving wheels to move the car. When the motor is again deactivated, the spring automatically returns the end of the rod holding the intermediate gears to the first end of the slot disengaging the intermediate gears from the driven gears, thereby freeing the driving wheels for rotation.

These and other objects of the invention will become more apparent to a worker skilled in the art upon reading the following detailed description taken in conjunction with the drawings, of which:

Figure 5:
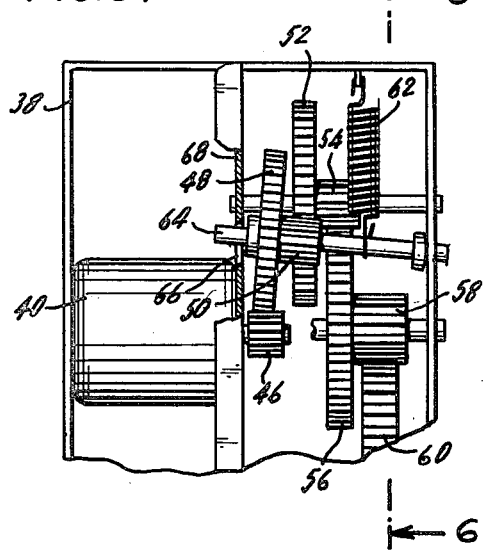
Figure 6:
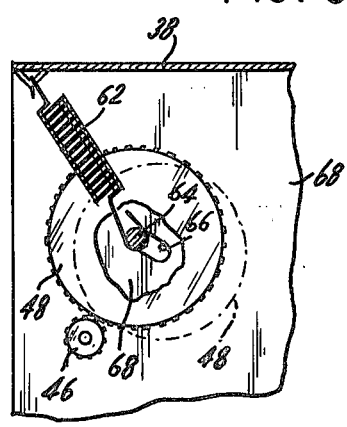

FIG. 5 is a partial and enlarged rear elevational view of the power source and transmission mechanism showing the intermediate gears disengaged from the driving and driven gears; and FIG. 6 is a sectional view taken along the line 6—6 of FIG. 5 and looking in the direction of the arrows and partially broken away to show, in full line, the spring biasing the end of the rod holding the intermediate gears to the first end of the slot to disengage the intermediate gears and, in dotted line, the position of the intermediate gears when the power source is activated.

Figure 1:
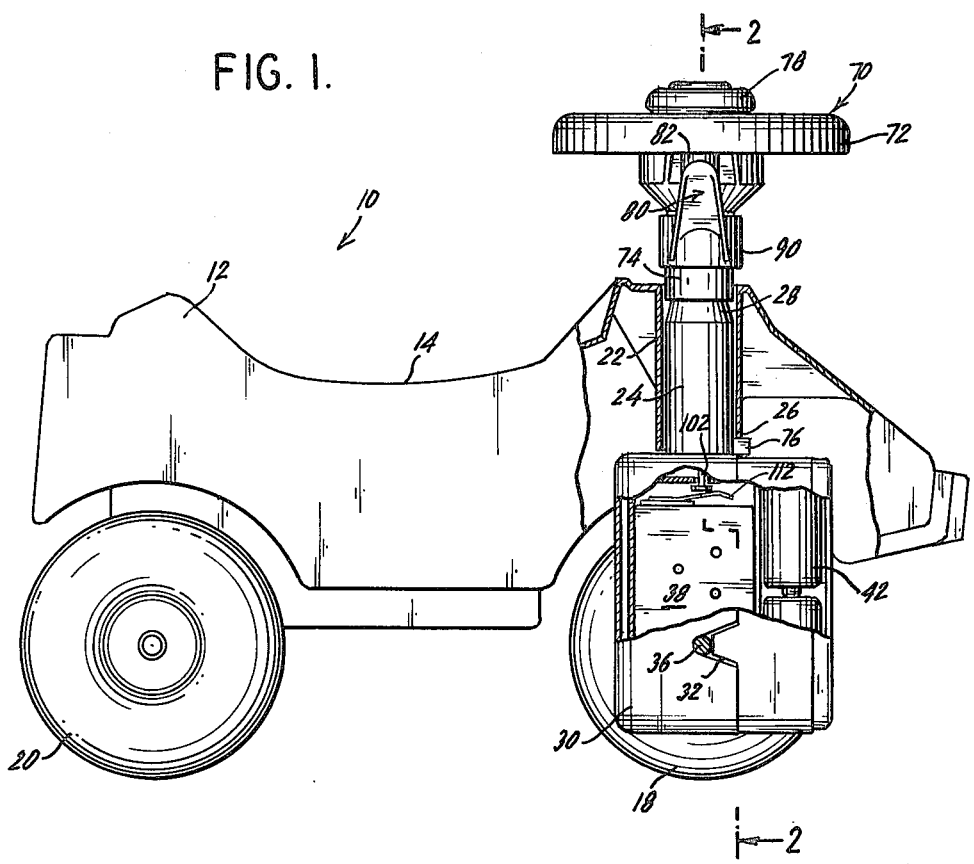
FIG. 1 is a side elevational view of the toy car of the invention partially cut away and partially in section having the power source and transmission mechanism mounted intermediate the front wheels of the car.
Figure 4:
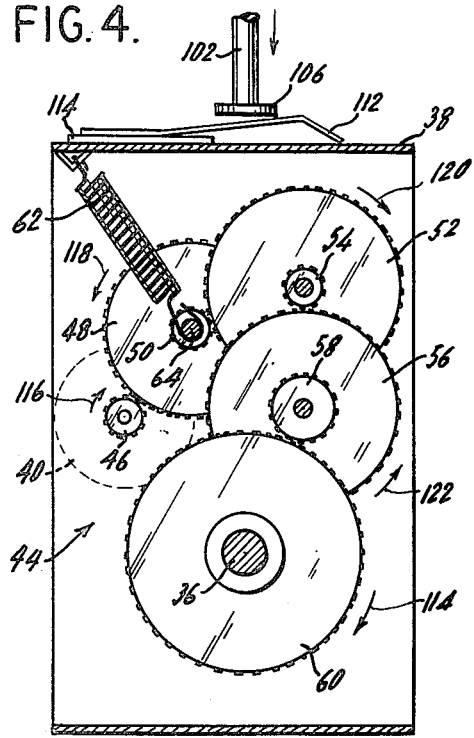
FIG. 4 is a view similar to FIG. 3, but showing the intermediate gears engaged with the driving and driven gears when the power source is activated, thereby applying power to the driving wheels of the car.
Figure 2:
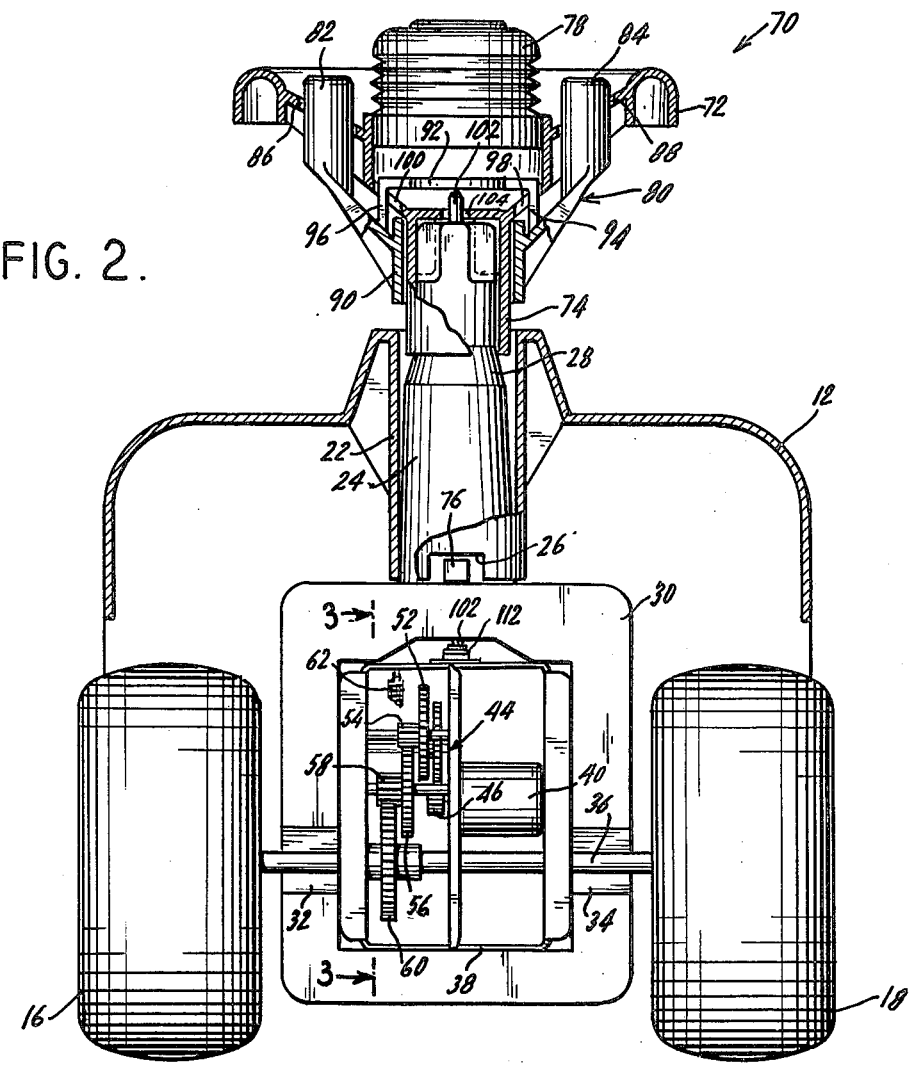
FIG. 2 is a sectional view taken along line 2—2 of FIG. 1 and looking in the direction of the arrows and showing more details of the power source, transmission mechanism and the manner of controlling them.

Referring to FIGS. 1 and 2, toy car 10 includes a body 12 formed, for example, of molded plastic or other suitable material having a seat portion 14 for supporting a child, front driving wheels 16, 18 and two rear driven wheels, one of which is indicated by reference numeral 20 and the other of which is not shown. It is understood that this invention is not limited to a toy car having front wheel drive and is applicable, for example, to a toy car having rear or four wheel drive.

Body 12 of toy car 10 is formed with a cylindrical sleeve 22 which receives steering column 24 formed with a rectangular slot 26 in the lower portion thereof and having a tapered upper portion 28.

Steering housing 30 preferably integrally formed with steering column 24 is positioned intermediate front driving wheels 16, 18. Housing 30 includes two cylindrical openings 32, 34 through which axle 36 holding driving wheels 16 and 18 passes with sufficient clearance to permit rotation of axle 36.

Referring now also to FIGS. 3-6, mounted within housing 30 is power housing 38 which contains within it power source 40, for example, a low voltage electric motor operable by batteries 42 and a transmission mechanism 44, for example, a gear train including driving gear 46, intermediate gears 48, 50 and driven gears 52, 54, 56, 58, 60. Axle 36 connected to driving wheels 16, 18 is secured to driven gear 60 such that when motor 40 is activated and the driving gear 46, intermediate gears 48 and 50 and driven gears 52 through 60 are all engaged, driving power is transmitted to driving wheels 16, 18 to cause the toy vehicle to move along a surface. A coil spring 62, partially shown in FIG. 2 and shown in greater detail in FIGS. 3-6 has one end connected to the wall of power housing 38 and the other end secured to rod 64 on which intermediate gears 48, 50 are mounted. Rod 64 has one end which rides in a slot 66 formed in an intermediate wall 68 of power housing 38.

Figure 3:
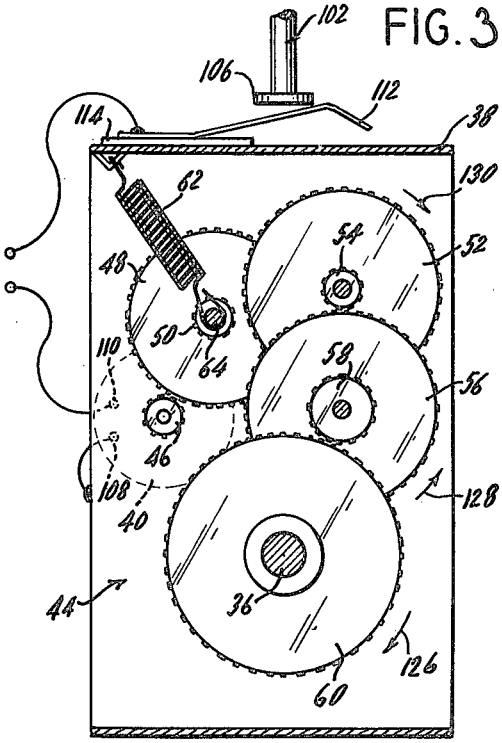
FIG. 3 is a sectional view taken along the line 3—3 of FIG. 2 and looking in the direction of the arrows and showing the intermediate gears of the transmission mechanism biased out of disengagement with the driving and driven gears when the power source is deactivated, thereby freeing the driving wheels of the car for rotation.

As best can be seen in FIGS. 3, 5 and 6, when motor 40 is not activated, spring 62 biases rod 64 to a first end of slot 66 taking intermediate gear 50 out of engagement with driven gear 52, thereby decoupling driven gears 52, 54, 56, 58, 60 from the driving gear 46 and motor 40. Driven gear 60 is therefore free to rotate, thereby permitting free rotation of driving wheels 16 and 18 in the absence of power from motor 40 so that the transmission mechanism and motor is not subjected to damage caused by rotation or attempted rotation of driving wheels 16, 18 when the motor 40 is deactivated. When power is applied to motor 40, as will be explained in more detail below, driving gear 46 rotates in a clockwise direction (see FIG. 4), causing intermediate gears 48 and 50 to rotate in a counterclockwise direction against the force of spring 62, thereby causing spring 62 to extend moving rod 64 within slot 66 until intermediate gear 50 engages driven gear 52 causing driven gear 52 to rotate in a counterclockwise direction, thereby causing rotation of driven gears 54, 56, 58 and 60 which thereby transmits power from motor 40 to driving wheels 16, 18 to cause the toy car to move along a surface. The force produced by rotation of driving gear 46 on intermediate gear 48 maintains the engagement of intermediate gear 50 and driven gear 52 during the time that motor 40 is activated. Upon deactivation of motor 40, driving gear 46 stops and the force produced by driving gear 46 on intermediate gear 48 to maintain engagement of intermediate gear 50 with driven gear 52 is removed. Spring 62 forces the end of rod 64 to move to its original rest position in slot 66 (FIGS. 3 and 6), thereby disengaging intermediate gear 50 from driven gear 52 and again freeing driving wheels 16 and 18 for rotation without damage to the transmission mechanism 44. Thus, the transmission mechanism automatically couples the power source 40 to drive wheels 16, 18 upon activation of the power source 40 and automatically decouples power source 40 from drive wheels 16, 18 upon deactivation of the power source to free the drive wheels for rotation when the power source is deactivated, thereby preventing damage to the transmission mechanism and power source. This whole operation is accomplished automatically without the necessity of moving levers or other mechanical devices which a child might inadvertently forget to move when using the toy car.

Returning now to FIGS. 1 and 2, the toy car further includes a steering assembly 70 including a steering wheel 72 integrally formed with an inner cylindrical member 74 which is attached to the tapered end 28 of steering column 24. Thus, rotation of steering wheel 72 causes rotation of steering column 24 which, in turn, causes rotation of steering housing 30 which, in turn, changes the orientation of driving wheels 16 and 18 relative to body 12 causing the toy car 10 to turn in a desired direction. A finger 76 formed on the upper part of steering housing 30 and extending through rectangular slot 26 of steering column 24 limits the extent to which steering column 24 and hence driving wheels 16 and 18 can be turned by steering wheels 72. Centrally mounted in the steering assembly 70 is a horn 78.

The toy car also includes an activating assembly 80 having a pair of activating cylinders 82, 84 which extend upwardly respectively through slots 86, 88 in steering assembly 70. Activating cylinders 82, 84 are integrally formed with sleeve 90 which is slidable relative to cylindrical member 74 when a downward force is applied to either activating cylinder 82 or 84. A disk 92 is connected to activating assembly 80 by arms 94, 96 which extend through slots 98, 100 in steering assembly 70. A shaft 102 is centrally positioned within steering column 24 with its upper end extending through a hole 104 in the upper portion of cylindrical member 74 into contact with the lower surface of disk 92 and its lower end extending through a hole 104 in the top of power housing 38 into the power housing and terminating in flange 106. Thus, a downward force on activating cylinders 82 will cause shaft 102 to move downward causing activation of motor 40 as will now be described.

As indicated in FIG. 3, motor 40 has one electrical input terminal 108 connected to a wall of power housing 38 which is formed of metal and the other electrical input terminal 110 connected to the positive terminal of batteries 42. The negative terminal of batteries 42 is connected to a metallic leaf spring 112 which is mounted on power housing 38 via insulator 114. In the deactivated state, FIG. 3, leaf spring 112 exerts an upward force of shaft 102 and is electrically isolated from power housing 38. A downward force on activating cylinders 82, 84 causes a downward force to be applied to shaft 102 pushing leaf spring 112 into electrical contact with the metallic wall of power housing 38 (see FIG. 4). With leaf spring 112 in electrical contact with power housing 38, the electrical circuit for motor 40 is complete and the motor is activated. Activation of motor 40 causes rotation of driving gear 46 in the clockwise direction indicated by arrow 116, FIG. 4 which, in turn, causes rotation of intermediate gear 48 in the counterclockwise direction, indicated by arrow 118, FIG. 4, thereby forcing rod 64 carrying intermediate gears 48 and 50 to move in slot 66 against the biasing force of spring 62 until intermediate gear 50 engages driven gear 52. Driven gear 52 then rotates in the clockwise direction, indicated by arrow 120 which, in turn, causes driven gears 56, 58 to rotate in the counterclockwise direction indicated by arrow 122 which, in turn, causes driving gear 60 to rotate in the clockwise direction as indicated by arrow 124, thereby causing rotation of axle 36 and driving wheels 16, 18 to cause movement of the toy car.

When the downward force is removed from activating cylinders 82, 84, the force on leaf spring 112 is removed, thereby permitting leaf spring 112 to move upward out of electrical contact with power housing 38. The activating electrical power to motor 40 is thereby removed, thereby causing rotation of motor 40 and driving gear 46 to stop. The absence of rotation of driving gear 46 removes the force on intermediate gear 48 which force had caused the movement of rod 64 in slot 66 and extended spring 62. Spring 62 is now free to contract to the position shown in FIG. 3 moving the end of rod 64 back to its rest position at one end of slot 66 (FIG. 6) which moves intermediate gear 50 out of engagement with driven gear 52. Driven gears 60, 58, 56, 54 and 52 are now free to rotate (as indicated by arrows 126, 128 and 130) upon the rotation of driving wheels 16 and 18 caused by a child attempting to move the toy vehicle 10 without activating motor 40. Freeing the drive wheels 16, 18 is accomplished automatically upon the deactivation of motor 40 and does not depend upon the subsequent operation by the child of another mechanism to bring about this result.

While what has been described is the presently preferred embodiment of the invention, it will be apparent to those skilled in the art that modifications and changes can be made to the invention while keeping within the spirit and scope thereof which is set forth in the appended claims.

What is claimed is:

1. A toy car comprising a body, a pair of front wheels and a pair of rear wheels, each pair of wheels coupled together by a supporting axle which is rotatably mounted relative to said body, a housing mounted intermediate said pair of front wheels, a motor and transmission mechanism mounted in said housing, said transmission mechanism including a driving gear coupled to said motor, a plurality of driven gears, at least one of which is coupled to the axle connecting said pair of front wheels and a plurality of intermediate gears movable into and out of driving engagement between said driven gears and said driving gear upon the activation and deactivation, respectively, of said motor, a steering assembly coupled to said front wheels for steering the car in a desired direction, and activating means selectively operable to activate and deactivate said motor which upon activation automatically causes said intermediate gear to engage the driven and driving gears to cause power to be applied to the front pair of wheels thereby causing the car to move and which upon deactivation automatically disengages at least one of the intermediate gears from driving engagement between the driving and driven gears freeing the front driving wheels of the toy for rotation to prevent damage to the car, said activating means including a leaf spring mounted on the housing, a shaft having one end positioned proximate to said leaf spring and means positioned proximate the other end of said shaft which upon application of a force thereto causes the shaft to force the leaf spring into electrical contact with said housing thereby causing power to be applied to said motor and upon removal of the force permitting said leaf spring to be brought out of electrical contact with the housing thereby removing power from said motor.

2. A toy car comprising a body, driving wheels coupled to said body to permit said car to be propelled along the surface, a power source mounted to said body, a transmission mechanism for operatively and selectively coupling said driving wheels to said power source, and activating means for activation of said power source, said transmission mechanism including a driving gear drivingly engaged with said power source, driven gear means operatively engaged with said driving wheels, and at least one intermediate gear capable of selective engagement with said driven gear means and in constant engagement with said driving gear, said driving gear causing a torsional force to be exerted on said intermediate gear upon activation of said power source, and spring means operatively engaged to exert a force on said intermediate gear to bias said intermediate gear out of engagement with said driven gear means when said power source is not activated, the force exerted by said spring means on said intermediate gear being overcome by said torsional force caused by said driving gear on said intermediate gear during activation of said power source to cause said intermediate gear to engage said driven gear means to drive said driving wheels.

3. A toy car comprising a body, driving wheels coupled to said body to permit said car to be propelled along the surface, a power source mounted to said body, a transmission mechanism for operatively and selectively coupling said driving wheels to said power source, and activating means which upon application of a force thereto causes power to be applied to said power source, and upon removal of said force curtailing power flow to said power source, said transmission mechanism including a driving gear drivingly engaged with said power source, driven gear means operatively engaged with said driving wheels, at least one intermediate gear capable of selective engagement with said driven gear means and in constant engagement with said driving gear, said driving gear causing a torsional force to be exerted on said intermediate gear upon activation of said power source, and spring means operatively engaged to exert a force on said intermediate gear to bias said intermediate gear out of engagement with said driven gear means when said power source is not activated, the force exerted by said spring means on said intermediate gear being overcome by said torsional force caused by said driving gear on said intermediate gear during activation of said power source to cause said intermediate gear to engage said driven gear means to drive said driving wheels.

4. A toy car comprising a body, driving wheels coupled to said body to permit said car to be propelled along the surface, a power source mounted to said body, a transmission mechanism for operatively and selectively coupling said driving wheels to said power source, said transmission mechanism including a driving gear operatively coupled to said power source, driven gear means drivingly coupled to said driving wheels, a first intermediate gear concentrically mounted with a second intermediate gear, said first intermediate gear in constant engagement with said driving gear whereby a torsional force is exerted on said concentrically mounted first and second intermediate gears when said power source is activated, said second intermediate gear capable of selective engagement with said driven gear means, first spring means operatively engaged to exert a force on said concentrically mounted first and second intermediate gears biasing said second intermediate gear out of engagement with said driven gear means when said power source is not activated, said force exerted by said spring means being overcome by said torsional force exerted on said concentrically mounted first and second intermediate gears to cause said second intermediate gear to positively engage with said driven gear means to activate said driving wheels.

5. The toy car of claim 4 wherein said activating means includes second spring means, a shaft having one end positioned proximate to said spring means and means positioned proximate the other end of said shaft which upon application of a force thereto causes the shaft to bring the spring means in electrical contact with said power source to cause electricity to be applied to said power source and upon removal of said force permitting said spring means to be brought out of electrical contact with said power source curtailing electricity flow to said power source.

* * * * *